United States Patent [19]
Franz et al.

[11] Patent Number: 5,802,350
[45] Date of Patent: Sep. 1, 1998

[54] SYSTEM AND METHOD FOR SELECTING AN INTERRUPT SYSTEM BASED UPON THE OPERATING SYSTEM OF A MULTIPROCESSOR SYSTEM

[75] Inventors: Keenan Wynn Franz, Austin; John David Purcell, Pflugerville, both of Tex.; Kevin F. Reick, Pleasant Valley, N.Y.

[73] Assignee: International Business Machines Corporation, Armonk, N.Y.

[21] Appl. No.: 591,245

[22] Filed: Jan. 18, 1996

[51] Int. Cl.[6] .................................................. G06F 9/46
[52] U.S. Cl. ...................... 395/500; 364/230.2; 364/280.8
[58] Field of Search ................................. 395/500, 385, 395/388, 739, 750; 364/230.2, 280.8

[56] References Cited

U.S. PATENT DOCUMENTS

| | | | |
|---|---|---|---|
| 4,261,034 | 4/1981 | Saccomano et al. | 364/200 |
| 4,482,954 | 11/1984 | Vrielink et al. | 364/200 |
| 5,099,414 | 3/1992 | Cole et al. | 395/200 |
| 5,129,064 | 7/1992 | Fogg, Jr. et al. | 395/500 |
| 5,175,853 | 12/1992 | Kardach et al. | 395/650 |
| 5,179,707 | 1/1993 | Piepho | 395/725 |
| 5,187,802 | 2/1993 | Inoue et al. | 395/800 |
| 5,297,282 | 3/1994 | Meilak et al. | 395/750 |
| 5,452,462 | 9/1995 | Matsuura et al. | 395/650 |
| 5,481,684 | 1/1996 | Richter et al. | 395/388 |
| 5,511,200 | 4/1996 | Jayakumar | 395/739 |
| 5,590,312 | 12/1996 | Marisetty | 395/500 |
| 5,638,525 | 6/1997 | Hammond et al. | 395/385 |

Primary Examiner—Kevin J. Teska
Assistant Examiner—Dan Fiul
Attorney, Agent, or Firm—Sawyer & Associates; Volel Emile

[57] ABSTRACT

A system and method for allowing different operating systems to be utilized in a multiprocessing system is provided in which each of the different operating systems requires different types of interrupt controllers. The system and method comprises detecting which of the at least two different types of operating systems is utilized within the multiprocessing system, and then selecting the appropriate interrupt controller from the different types of interrupt controllers.

15 Claims, 1 Drawing Sheet

SYSTEM AND METHOD FOR SELECTING AN INTERRUPT SYSTEM BASED UPON THE OPERATING SYSTEM OF A MULTIPROCESSOR SYSTEM

FIELD OF THE INVENTION

The present invention relates generally to a multiprocessor system and more particularly to a system for selecting an interrupt system in a multiprocessor system.

BACKGROUND OF THE INVENTION

As different computer architectures are utilized, it has become important to provide functionality across those architectures. This is increasingly significant when these different computer architectures can be utilized in the same multiprocessing environment.

For example, the PowerPC™ Architecture Specification defines a distributed interrupt method designed for high-performance multiprocessor computers. However, the Converged Hardware Reference Platform (CHRP) agreed to by IBM and Apple Computer defines an interrupt method that carries a legacy from the Personal Computer (PC) architecture, which is Intel X86 compatible which is incompatible with the PowerPC™ Architecture interrupt method. Operating Systems (OS) that have ancestry in the PC expect the host system to implement the PC interrupt method, whereas other OS's may expect the host system to implement the PowerPC™ Architecture interrupt method. The PowerPC™ Architecture interrupt method is expected to yield higher performance in a multi-processor computer than the PC interrupt method; however, hardware compatibility with PC OS's demands implementation of the PC interrupt method.

Therefore in order for a computer to be compatible with OS's of either heritage an interrupt system is needed that allows a computer to personalize itself depending on what OS is loaded. The present invention addresses such a need.

SUMMARY OF THE INVENTION

A system and method for allowing different operating systems to be utilized in a multiprocessing system is provided in which each of the different operating systems requires different types of interrupt controllers. The system and method comprises detecting which of the different operating systems is utilized within the multiprocessing system, and then selecting the appropriate interrupt controller from the different types of interrupt controllers.

The circuitry for both interrupt controllers is preferably implemented on a single computer design with a registered bit that may be toggled to invoke either interrupt method. This register bit is logically located in the reserved system address space and thus protected from errant or malicious application software. Since PC-origin OS's such as Microsoft's Windows NT™ or IBM's OS/2™ are unaware of other interrupt methods and expect a hardware implementation of the PC interrupt method, any system implementing the bimodal interrupt structure described herein will default to the PC interrupt method.

The default method is set by the Initial Program Load (IPL) code which is customized to the specific host system and is contained in Read Only Memory (ROM) hardware. The IPL code can examine the boot record from the operating system about to be loaded and if the IPL code recognizes the operating system type, it can then select the proper interrupt controller via the register bit. Other OS's can be made "aware" of the bimodal nature of the interrupt hardware and can switch into the high-performance PowerPC™ interrupt mode.

These and other advantages of the aspects of the present invention will be more fully understood in conjunction with the following detailed description and accompanying drawings.

DESCRIPTION OF THE INVENTION

Figure 1:
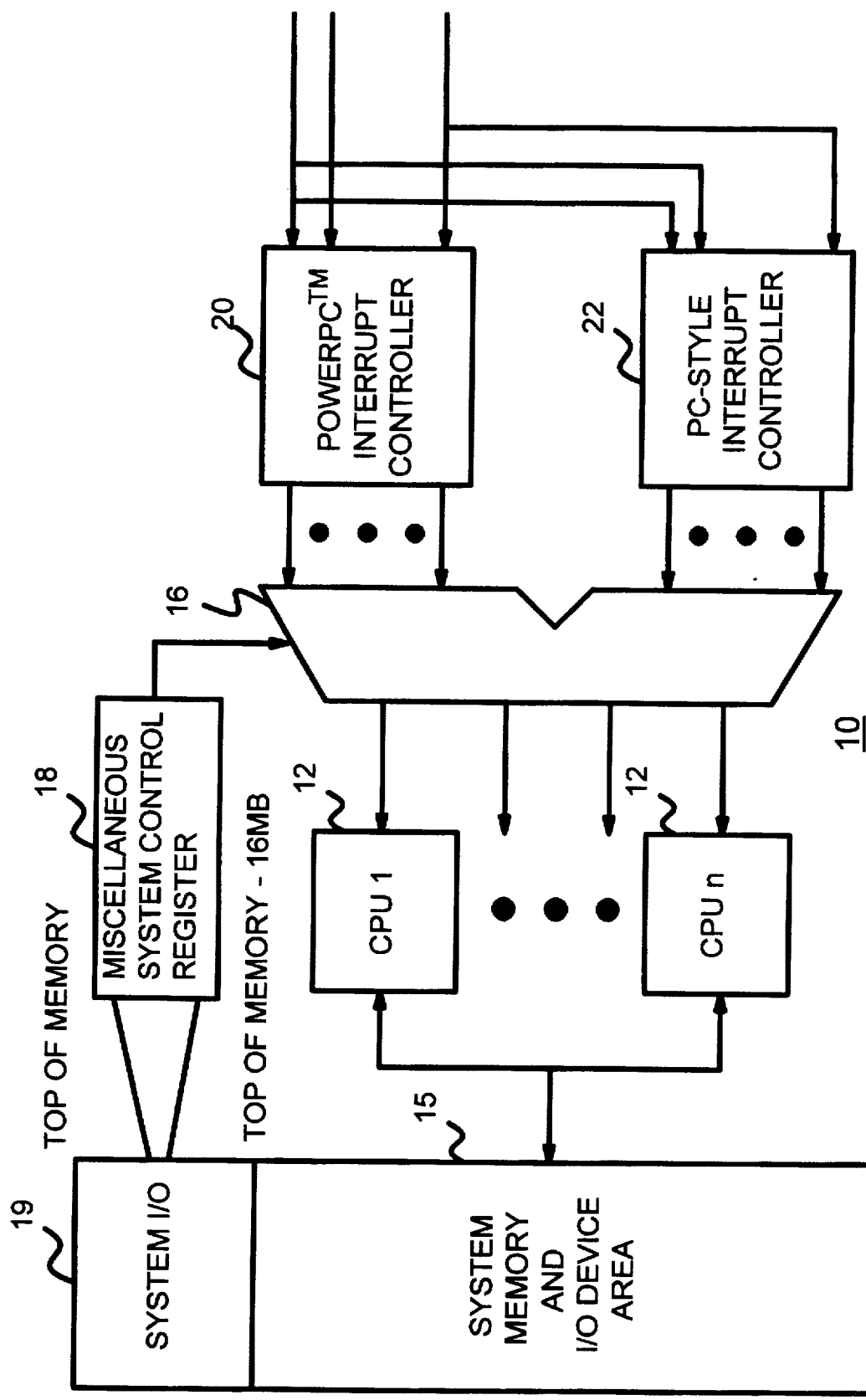
FIG. 1 is a block diagram of a system for selecting an interrupt system in a multiprocessor in accordance with the present invention.

The present invention is directed toward an improvement in a multiprocessor system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A system and method is provided that allows for the detection of operating systems that are being utilized in the multiprocessing environment, and then the selection of the appropriate interrupt controller. In a preferred embodiment, circuitry is utilized to implement the present invention. However, one of ordinary skill in the art recognizes that the present invention could be implemented on a computer readable medium and that use would be within the spirit and scope of the present invention.

In a preferred embodiment, the circuitry for both interrupt controllers is implemented on a single computer design with a registered bit that may be toggled to invoke either interrupt controller. This register bit is logically located in the reserved system address space and thus protected from errant or malicious application software.

To more particularly describe the present invention, refer now to FIG. 1, which is a block diagram of a multiprocessor system (MP) 10 including an interrupt selection system. The MP system includes a plurality of central processing units CPUs 12. The CPU 12 shares memory and I/O space 15 of the addressable memory space 14.

The MP system includes a selector, in this case multiplexer 16 which is controlled by a bit in a system control register 18 in the addressable space 14. The multiplexer 16 receives interrupt signals from interrupt controllers 20 and 22 where each of the interrupt controllers 20 and 22 are utilized for different types of operating systems. Through the use of a bit within the register 18 to select the appropriate interrupt system 20 and 22 a multiprocessing system is provided that has improved performance. The register 18 is in a reserved system space 19 that is at a higher privilege level than application software.

In a preferred embodiment, the circuitry for selecting both interrupt controllers is implemented on a single computer design with a registered bit that may be toggled to invoke either interrupt method. This register bit is logically located in the reserved system address space and thus protected from errant or malicious application software.

Since PC-origin OS's such as Microsoft's Windows NT™ or IBM's OS/2™ which are compatible with Intel X86 based architectures are unaware of other interrupt methods and expect a hardware implementation of the PC interrupt method, any system implementing the bimodal interrupt structure described herein will default to the PC interrupt method. In a preferred embodiment, the default method is set by the Initial Program Load (IPL) code which is customized to the specific host system and is contained in Read Only Memory (ROM) hardware. The IPL code can examine the boot record from the operating system about to be loaded and if the IPL code recognizes the operating system type, it can then select the proper interrupt controller via the register bit. Other OS's can be made "aware" of the bimodal nature of the interrupt hardware and can switch into the high-performance PowerPC™ architecture interrupt mode.

Thus, the present invention has been described herein with reference to a particular embodiment for a particular application. For example, one of ordinary skill in the art will readily recognize that although the selection system has been described in the context of operating systems compatible with the PowerPC™ architecture and Intel X86 compatible architectures, the selection system could be utilized with a variety of operating systems and their use would be within the spirit and scope of the present invention. In addition, although the present invention has been discussed in the context of two different types of interrupt controllers, one of ordinary skill in the art will readily recognize that any number of controllers could be utilized. Those having ordinary skill in the art and access to the present teachings will recognize additional modifications applications and embodiments within the scope thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

We claim:

1. A system for allowing different operating systems to be utilized in a multiprocessing system, each of the different types of operating systems requiring different types of interrupt controllers, the system comprising:

means for detecting which of the different operating systems is utilized within the multiprocessing system; and means responsive to the detecting means for selecting the appropriate interrupt controller from the different types of interrupt controllers.

2. The system of claim 1 in which different types of processor architectures can be utilized.

3. The system of claim 1 in which the detecting means comprises an internal program load code for detecting the operating system by examining a boot record for the operating system.

4. The system of claim 1 in which the detecting means comprises the operating system detecting a bimodal nature of an interrupt and then switching into a particular interrupt mode.

5. The system of claim 3 in which the selector means comprises a multiplexer which is responsive to a bit being toggled to invoke the appropriate interrupt controller.

6. The system of claim 5 in which the different processor architectures comprise an Intel X86 compatible architecture and an architecture utilizing a distributed interrupt method.

7. A method for allowing different operating systems to be utilized in a multiprocessing system, each of the different operating systems requiring different types of interrupt controllers, the method comprising the steps of:

(a) detecting which of the different operating systems is utilized within the multiprocessing system; and (b) selecting the appropriate interrupt controller from the different types of interrupt controllers.

8. The method of claim 7 in which different types of processor architectures can be utilized.

9. The method of claim 7 in which the detecting step (a) comprises detecting the operating system by examining a boot record for the operating system.

10. The method of claim 7 in which the detecting step comprises the operating system detecting a bimodal nature of an interrupt and then switching into a particular interrupt mode.

11. The method of claim 10 in which the selecting step (b) comprises toggling a bit to invoke the appropriate interrupt controller.

12. The method of claim 11 in which the different processor architectures comprise an Intel X86 compatible architecture and an architecture utilizing a distributed interrupt method.

13. A system for allowing an operating system for an architecture utilizing a distributed interrupt method and an Intel X86 compatible operating system to be selectively utilized in a multiprocessing system, the system comprising:

means for detecting which of the operating system for the architecture utilizing a distributed interrupt method and the Intel X86 compatible operating system is utilized within the multiprocessing system; and a multiplexer responsive to the state of a bit for selecting an appropriate interrupt controller.

14. The system of claim 13 in which the detecting means comprise an internal program load code for detecting the operating system by examining a boot record for the operating system.

15. The system of claim 13 in which the detecting means comprises the operating system detecting a bimodal nature of the interrupt and then switching into a particular interrupt mode.

* * * * *